United States Patent
Yeo et al.

(10) Patent No.: US 10,082,612 B2
(45) Date of Patent: Sep. 25, 2018

(54) WIRE GRID POLARIZER, DISPLAY DEVICE INCLUDING THE SAME, AND METHOD OF FABRICATING THE SAME

(71) Applicant: Samsung Display Co. Ltd., Yongin, Gyeonggi-Do (KR)

(72) Inventors: Yun Jong Yeo, Seoul (KR); Jung Ha Son, Seoul (KR); Joo Hyung Lee, Seongnam-si (KR); Hyung Bin Cho, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/727,269

(22) Filed: Jun. 1, 2015

(65) Prior Publication Data
US 2016/0161654 A1 Jun. 9, 2016

(30) Foreign Application Priority Data
Dec. 5, 2014 (KR) .................. 10-2014-0173737

(51) Int. Cl.
*G02B 5/30* (2006.01)
*G02F 1/1335* (2006.01)

(52) U.S. Cl.
CPC .............. *G02B 5/3058* (2013.01); *G02F 2001/133548* (2013.01)

(58) Field of Classification Search
CPC .................................................. G02B 5/3058
USPC ............ 359/485.05, 485.01, 485.03, 485.04; 369/112.03, 112.16
See application file for complete search history.

(56) References Cited

U.S. PATENT DOCUMENTS

| | | | |
|---|---|---|---|
| 6,288,840 B1 | 9/2001 | Perkins et al. | |
| 7,965,357 B2 | 6/2011 | Van De Witte et al. | |
| 2004/0125449 A1* | 7/2004 | Sales | G02B 5/3058 359/485.05 |
| 2009/0283768 A1 | 11/2009 | Wang et al. | |
| 2012/0057106 A1 | 3/2012 | Park et al. | |
| 2013/0077164 A1* | 3/2013 | Davis | G02B 5/3058 359/485.05 |
| 2013/0155516 A1* | 6/2013 | Lines | G02B 5/0252 359/599 |
| 2013/0182405 A1* | 7/2013 | Kaufman | G02F 1/13439 362/19 |

(Continued)

FOREIGN PATENT DOCUMENTS

| | | | | |
|---|---|---|---|---|
| EP | 2322979 A1 * | 5/2011 | ....... | G02F 1/133536 |
| EP | 2487531 A1 | 8/2012 | | |

(Continued)

OTHER PUBLICATIONS

"European Search Report," European Patent Office, dated May 12, 2016, 9 pages, Munich, Germany.

*Primary Examiner* — Stephone B Allen
*Assistant Examiner* — Travis Fissel
(74) *Attorney, Agent, or Firm* — Innovation Counsel LLP

(57) ABSTRACT

Provided are light source module and backlight unit. A wire grid polarizer including a substrate, and a plurality of conductive wire patterns configured to be formed parallel to one another on the substrate, wherein each of the conductive wire patterns includes a first conductive wire pattern, an insulating layer and a second conductive wire pattern and the first and second conductive wire patterns are electrically insulated from each other and have different shapes.

8 Claims, 27 Drawing Sheets

(56) References Cited

U.S. PATENT DOCUMENTS

2013/0271834 A1    10/2013  Kim et al.
2014/0133027 A1*    5/2014  Jang .................... G02B 5/3058
                                                           359/485.03

FOREIGN PATENT DOCUMENTS

| KR | 10-2007-0105092 A | 10/2007 |
| KR | 10-2009-0102113 A | 9/2009 |
| KR | 10-2013-0024041 A | 3/2013 |
| KR | 10-2013-0101972 A | 9/2013 |
| KR | 10-2014-0140181 A | 12/2014 |
| KR | 10-2015-0085161 A | 7/2015 |
| WO | 2006034051 A2 | 3/2006 |

\* cited by examiner

WIRE GRID POLARIZER, DISPLAY DEVICE INCLUDING THE SAME, AND METHOD OF FABRICATING THE SAME This application claims priority to Korean Patent Application No. 10-2014-0173737 filed on Dec. 5, 2014 in the Korean Intellectual Property Office, the disclosure of which is incorporated herein by reference in its entirety.

BACKGROUND

1. Field of the Invention

The invention relates to a wire grid polarizer, a display device including the same, and a method of fabricating the same.

2. Description of the Related Art

A parallel conduction wire array in which conductor wires are arranged parallel to one another to polarize light from electromagnetic waves is generally referred to as a "wire grid polarizer."

In response to non-polarized light being incident, a wire grid polarizer with a smaller period than the wavelength of the incident light reflects polarized light parallel to a direction of the wires thereof, and transmits therethrough polarized light perpendicular to the direction of the wires thereof. A wire grid polarizer is more beneficial than an absorptive polarizer because it allows reflected polarized light to be reused.

A wire grid polarizer is generally formed of a conductive material. However, if the conductive material is naturally oxidized, an oxide layer is formed on the surface of the conductive material. The oxide layer generally has a high refractive index, and the higher the refractive index of the wire grid polarizer, the lower will be its transmissivity and extinction ratio for visible light.

SUMMARY

Exemplary embodiments provide a wire grid polarizer with excellent optical properties, a display device having the wire grid polarizer, and a method of fabricating the wire grid polarizer.

However, exemplary embodiments of the disclosure are not restricted to those set forth herein. The above and other exemplary embodiments of the inventive concept will become more apparent to one of ordinary skill in the art to which the disclosure pertains by referencing the detailed description given below.

According to an exemplary embodiment, there is provided a wire grid polarizer comprising a substrate and a plurality of conductive wire patterns formed parallel to one another on the substrate, wherein each of the conductive wire patterns includes a first conductive wire pattern, an insulating layer and a second conductive wire pattern, and wherein and the first and second conductive wire patterns are electrically insulated from each other and have different shapes.

In another aspect, there is provided a wire grid polarizer comprising a substrate and a plurality of conductive wire patterns formed on the substrate, wherein each of the conductive wire patterns includes a plurality of layers and at least one insulating layer disposed between the plurality of layers and at least some of the conductive wire patterns have a different shape from the rest of the conductive wire patterns.

According to yet another exemplary embodiment of the inventive concept, there is provided a method of fabricating a wire grid polarizer, the method comprising performing a first process of forming a first conductive wire pattern layer, an insulating layer, a second conductive wire pattern layer and a mask layer on a substrate, performing a second process of patterning the mask layer to form a plurality of heights on the mask layer, performing a third process of removing the hard mask layer from an area where the mask layer is completely removed during the second process and removing part of the mask layer that remains elsewhere, performing a fourth process of removing the second conductive wire pattern layer from an area where the hard mask layer is removed during the third process, performing a fifth process of removing the insulating layer from an area where the second conductive wire pattern layer is removed during the fourth process and the hard mask layer from an area where part of the remaining mask layer is removed during the third process, and performing a sixth process of removing the first conductive wire pattern layer from an area where the insulating layer is removed during the fifth process and the second conductive wire pattern layer from the hard mask layer is removed during the fifth process.

According to the exemplary embodiments, it is possible to provide a wire grid polarizer with excellent optical properties.

Other features and exemplary embodiments will be apparent from the following detailed description, the drawings, and the claims.

DETAILED DESCRIPTION OF THE EMBODIMENTS

Figure 1:
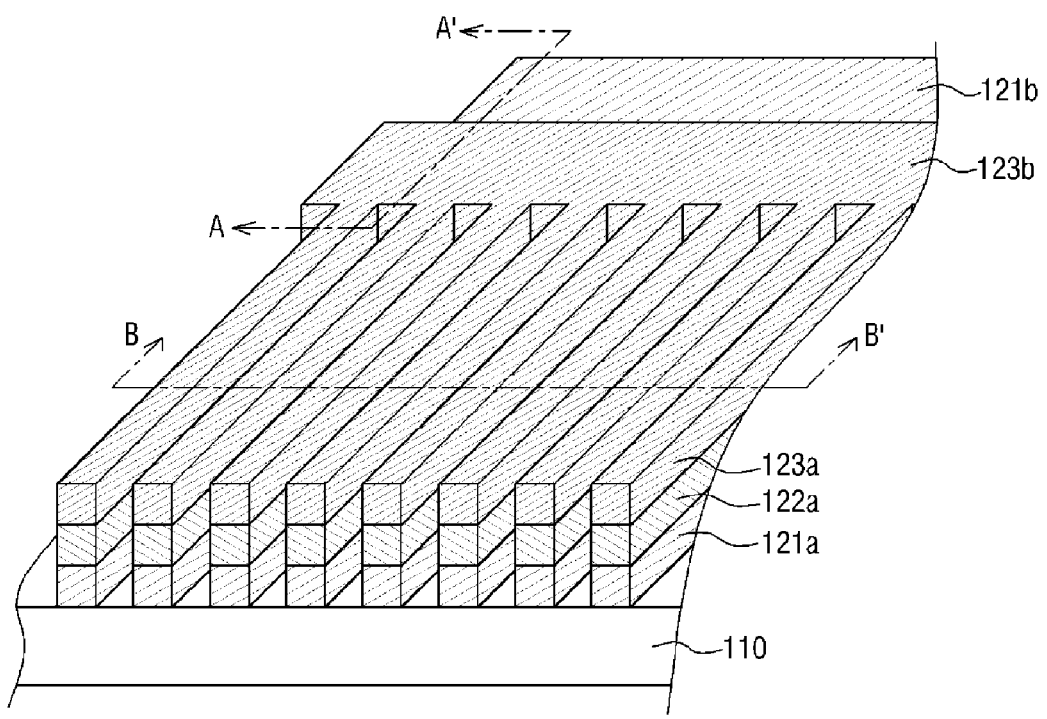
FIG. 1 is a perspective view of a wire grid polarizer according to an exemplary embodiment of the inventive concept.

Aspects and features of the present disclosure and methods for achieving the aspects and features will be apparent by referring to the embodiments that are described in detail with reference to the accompanying drawings. However, the concept presented herein is not limited to the embodiments disclosed, and can be implemented in various forms. The matters defined in the description, such as the detailed construction and elements, are nothing but specific details provided to assist those of ordinary skill in the art in a comprehensive understanding of the inventive concept, and the concept is only defined within the scope of the disclosure. In the description, the same reference numerals are used for the same elements across various figures. In the drawings, sizes and relative sizes of layers and areas may be exaggerated for clarity in explanation.

The term "on" that is used to designate that an element is on another element located on a different layer or a layer includes both a case where an element is located directly on another element or a layer and a case where an element is located on another element via another layer or still another element.

Although the terms "first, second, and so forth" are used to describe various constituent elements, such constituent elements are not limited by the terms. The terms are used only to differentiate a constituent element from another constituent element. Accordingly, in the following description, a first constituent element may be similar to a second constituent element. Hereinafter, embodiments of the present inventive concept will be described with reference to the accompanying drawings.

Figure 2:
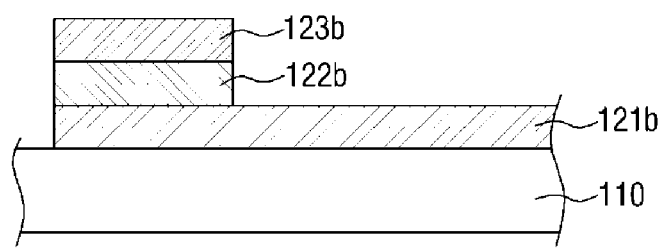
FIG. 2 is a cross-sectional view taken along line A-A' of FIG. 1.
Figure 3:
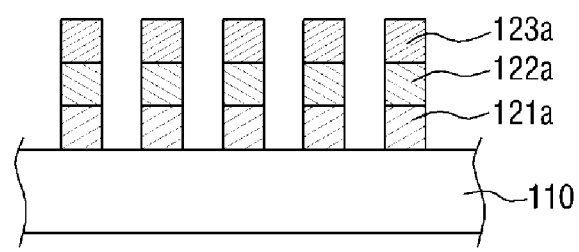
FIG. 3 is a cross-sectional view taken along line B-B' of FIG. 1.

FIG. 1 is a perspective view of a wire grid polarizer according to an exemplary embodiment, FIG. 2 is a cross-sectional view taken along line A-A' of FIG. 1, and FIG. 3 is a cross-sectional view taken along line B-B' of FIG. 1.

Referring to FIGS. 1 to 3, a wire grid polarizer according to an exemplary embodiment may include a substrate 110, a wire pattern area and a non-wire pattern area. The wire pattern area may include a plurality of first conductive wire patterns 121a formed parallel to one another and protruding from the substrate 110, a plurality of insulating wire patterns 122a that are disposed on respective ones of the first conductive wire patterns 121a, and a plurality of second conductive wire patterns 123a that are disposed on the respective insulating wire patterns 122a. The non-wire pattern area may include a first conductive pattern 121b, an insulating pattern 122b disposed on the first conductive pattern 121b, and a second conductive pattern 123b disposed on the insulating pattern 122b.

Suitable material for the substrate 110 may be selected considering the use and the type of processing that the substrate 110 will be subjected to, as long as it allows the substrate 110 to transmit visible light. For example, the substrate 110 may be formed of various polymers such as glass, quartz, acrylic, triacetyl cellulose (TAC), a cyclic olefin copolymer (COP), a cyclic olefin polymer (COC), polycarbonate (PC), polyethylenenaphthalate (PET), or polyethersulfone (PES), with the understanding that this is not an exhaustive list of possibilities. The substrate 110 may be formed of an optical film material with a certain degree of flexibility.

In the wire pattern area, the first conductive wire patterns 121a, the insulating wire patterns 122a and the second conductive wire patterns 123a may be sequentially stacked and may be arranged in parallel on the substrate 110 with a regular period. The shorter the period of the first conductive wire patterns 121a, the insulating wire patterns 122a and the second conductive wire patterns 123a, the higher the polarized light extinction ratio of the first conductive wire patterns 121a, the insulating wire patterns 122a and the second conductive wire patterns 123a with respect to the wavelength of incident light, but the more difficult it becomes to fabricate the first conductive wire patterns 121a, the insulating wire patterns 122a and the second conductive wire patterns 123a. Visible light generally falls within the range of wavelengths of about 380 nm to about 780 nm. In order for the wire grid polarizer according to an exemplary embodiment to have a high extinction ratio with respect to the three primary colors (i.e., red (R), green (G) and blue (B)) of light, the first conductive wire patterns 121a, the insulating wire patterns 122a and the second conductive wire patterns 123a may need to be formed to have a period of at least about 200 nm or less to adequately perform polarization. The first conductive wire patterns 121a, the insulating wire patterns 122a and the second conductive wire patterns 123a may be formed to have a period of 120 nm or less to offer at least as high a polarization performance as a different type of polarizer that is currently available in the market.

The first conductive wire patterns 121a and the second conductive wire patterns 123a may be formed of any conductive material. In an exemplary embodiment, the first conductive wire patterns 121a and the second conductive wire patterns 123a may be formed of a metal material, and particularly, a metal selected from the group consisting of aluminum (Al), chromium (Cr), gold (Au), silver (Ag), copper (Cu), nickel (Ni), iron (Fe), tungsten (W), cobalt (Co), molybdenum (Mo) or an alloy, an oxide or a nitride thereof. This is not an exhaustive list of possibilities, and the invention is not limited thereto.

In an exemplary embodiment, the first conductive wire patterns 121a, the first conductive pattern 121b, the second conductive wire patterns 123a and the second conductive pattern 123b may include Al, or may also include Ti or Mo at the top of the Al, but the invention is not limited thereto. More specifically, in forming the first conductive wire patterns 121a, the first conductive pattern 121b, the second conductive wire patterns 123a and the second conductive pattern 123b being formed of Al alone, hillocks may be generated during subsequent processes depending on the temperature of the subsequent processes. As a result, the top surfaces of the first conductive wire patterns 121a, the first conductive pattern 121b, the second conductive wire patterns 123a and the second conductive pattern 123b may become irregular, and the optical properties of the first conductive wire patterns 121a, the first conductive pattern 121b, the second conductive wire patterns 123a and the second conductive pattern 123b may deteriorate. To prevent the generation of hillocks, Ti or Mo may be additionally formed on the Al.

The insulating wire patterns 122a may be formed of any insulating material. In an exemplary embodiment, the insulating wire patterns 122a may be formed of an organic material or an inorganic material, and examples of the inorganic material include SiOx, SiNx and SiOC. However, the invention is not limited to this exemplary embodiment.

In an exemplary embodiment, the refractive index of the insulating wire patterns 122a may be set to such a range that the insulating wire patterns 122a may provide excellent optical properties (such as the degree of polarization), for example, a range of 1.0 to 2.0, but the invention is not limited thereto.

The width of the first conductive wire patterns 121a, the insulating wire patterns 122a and the second conductive wire patterns 123a may be set to such a range that the first conductive wire patterns 120 may provide favorable polarization performance, for example, a range of about 10 nm to about 200 nm, but the invention is not limited thereto. The thickness of the first conductive wire patterns 121a may be set to a range of about 10 nm to about 500 nm, but the invention is not limited thereto.

In the non-wire pattern area, the first conductive pattern 121b and the second conductive pattern 123b may be patterned into different shapes.

The insulating pattern 122b may have the same shape as the second conductive pattern 123b, but the invention is not limited thereto. Alternatively, the insulating pattern 122b may have a different shape from the second conductive pattern 123b.

In the wire pattern area, the insulating wire patterns 122a may be disposed between the first conductive wire patterns 121a and the second conductive wire patterns 123a, and may electrically insulate the first conductive wire patterns 121a and the second conductive wire patterns 123a from each other. Similarly, in the non-wire pattern area, the insulating wire pattern 122b may be disposed between the first conductive pattern 121b and the second conductive pattern 123b, and may electrically insulate the first conductive pattern 121b and the second conductive pattern 123b from each other.

The first conductive wire patterns 121a, the first conductive pattern 121b, the second conductive wire patterns 123a and the second conductive pattern 123b may perform the functions of a wire grid polarizer together, and at the same time, may be used for different additional purposes.

Examples of the different additional purposes of use of the first conductive wire patterns 121a, the first conductive pattern 121b, the second conductive wire patterns 123a and the second conductive pattern 123b include wires, storage electrodes and electromagnetic-shielding layers using conductive patterns. More specifically, the first conductive wire patterns 121a and the first conductive pattern 121b may be used at an upper substrate of a display device as wires or common electrodes for a touch screen, but the invention is not limited thereto. Alternatively, the second conductive wire patterns 123a and the second conductive pattern 123b may be used at a lower substrate of a display device as storage electrodes and may be provided with the same voltage as common electrodes, but the invention is not limited thereto.

Figure 4:
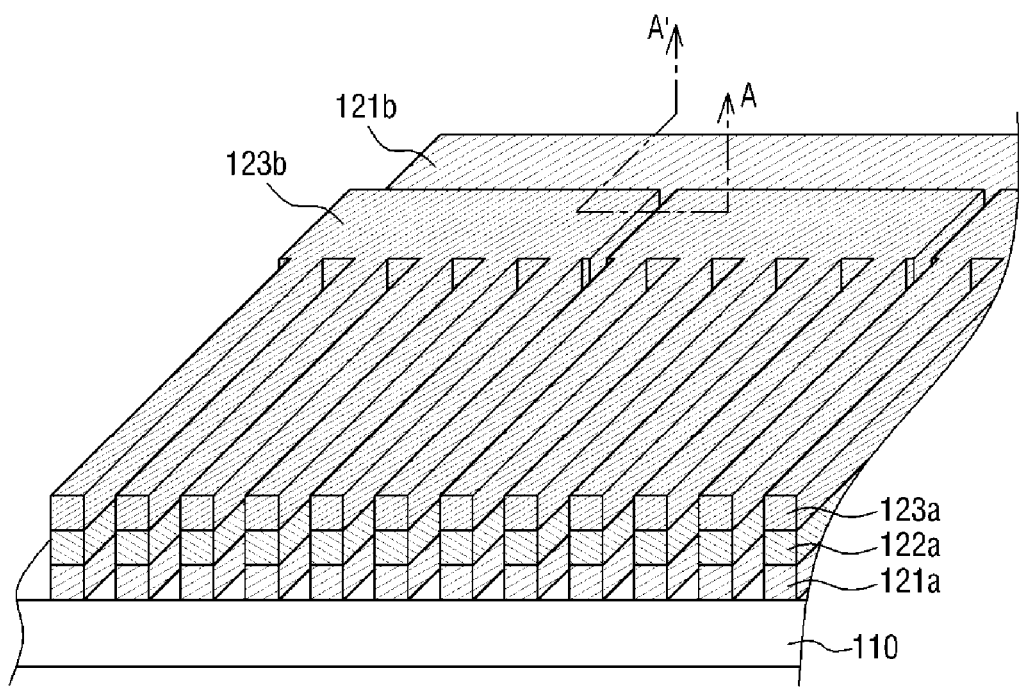
FIG. 4 is a perspective view of a wire grid polarizer according to another exemplary embodiment of the inventive concept.
Figure 5:
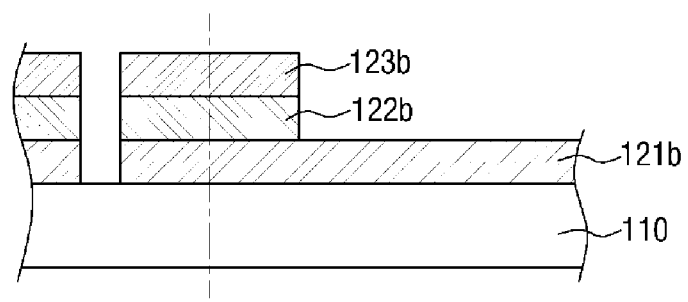
FIG. 5 is a cross-sectional view taken along line A-A' of FIG. 4.

FIG. 4 is a perspective view of a wire grid polarizer according to another exemplary embodiment of the invention, and FIG. 5 is a cross-sectional view taken along line A-A' of FIG. 4.

A wire pattern area of the wire grid polarizer according to another exemplary embodiment of the invention is the same as the wire pattern area of FIG. 1, and is thus not illustrated in FIG. 4.

Referring to FIGS. 4 and 5 and further to FIG. 3, the wire grid polarizer according to another exemplary embodiment of the invention may include a wire pattern area and a non-wire pattern area. The wire pattern area may include a substrate 110, a plurality of first conductive wire patterns 121a that are formed parallel to one another and protrude from the substrate 110, a plurality of insulating wire patterns 122a that are disposed on the respective ones of the first conductive wire patterns 121a, and a plurality of second conductive wire patterns 123a that are disposed on respective insulating wire patterns 122a. The non-wire pattern area may include a first conductive pattern 121b, an insulating pattern 122b that is disposed on the first conductive pattern 121b, and a second conductive pattern 123b that is disposed on the insulating pattern 122b.

The wire pattern area may include at least one wire pattern block, which includes the first conductive wire patterns 121a, the insulating wire patterns 122a and the second conductive wire patterns 123a.

The first conductive wire patterns 121a, the insulating wire patterns 122a and the second conductive wire patterns 123a of the wire pattern block may be electrically connected to one another in the non-wire pattern area.

In an exemplary embodiment, the second conductive wire patterns 123a of the wire pattern block and the second conductive pattern 123b may be electrically insulated from each other, but the inventive concept is not limited thereto. The first conductive wire patterns 121a of the wire pattern block and the first conductive pattern 121b may also be insulated from each other.

The wire grid polarizer of FIGS. 4 and 5 is substantially similar to the wire grid polarizer of FIGS. 1 to 3 other than what is described above and thus, a detailed description thereof will be omitted.

Figure 6:
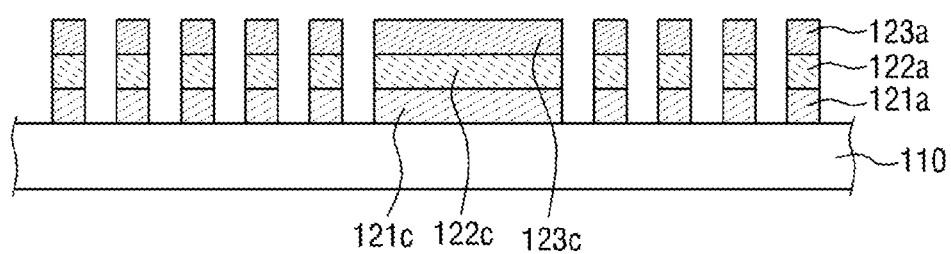
FIG. 6 is a cross-sectional view of a wire grid polarizer according to another exemplary embodiment of the inventive concept.

FIG. 6 is a cross-sectional view of a wire grid polarizer according to another exemplary embodiment of the invention.

Referring to FIG. 6 and further to FIGS. 1 to 3, the wire grid polarizer according to another exemplary embodiment of the invention may include a substrate 110, a plurality of wire patterns and a reflective layer in a wire pattern area thereof. The wire patterns may include a plurality of first conductive wire patterns 121a, which are formed parallel to one another and protrude from the substrate 110, a plurality of insulating wire patterns 122a that are disposed on the respective ones of the first conductive wire patterns 121a, and a plurality of second conductive wire patterns 123a that are disposed on the respective insulating wire patterns 122a and the reflective layer may include a first conductive reflective layer pattern 121c that is formed on the substrate 110 and protrude from the substrate 110, an insulating reflective layer pattern 122c that is disposed on the first conductive reflective layer pattern 121c, and a second conductive reflective layer pattern 123c that is disposed on the insulating reflective layer pattern 122c.

The reflective layer may correspond to an area where nano-patterns, i.e., the wire patterns, are not formed, and may be formed in an area corresponding to a non-opening part of a display device having the wire grid polarizer according to another exemplary embodiment. For example, the reflective layer may be formed in a wiring area or a transistor area, but the inventive concept is not limited thereto.

The wire grid polarizer of FIG. 6 is substantially similar to the wire grid polarizer of FIGS. 1 to 3 in other aspects and thus, a detailed description thereof will be omitted.

Figure 7:
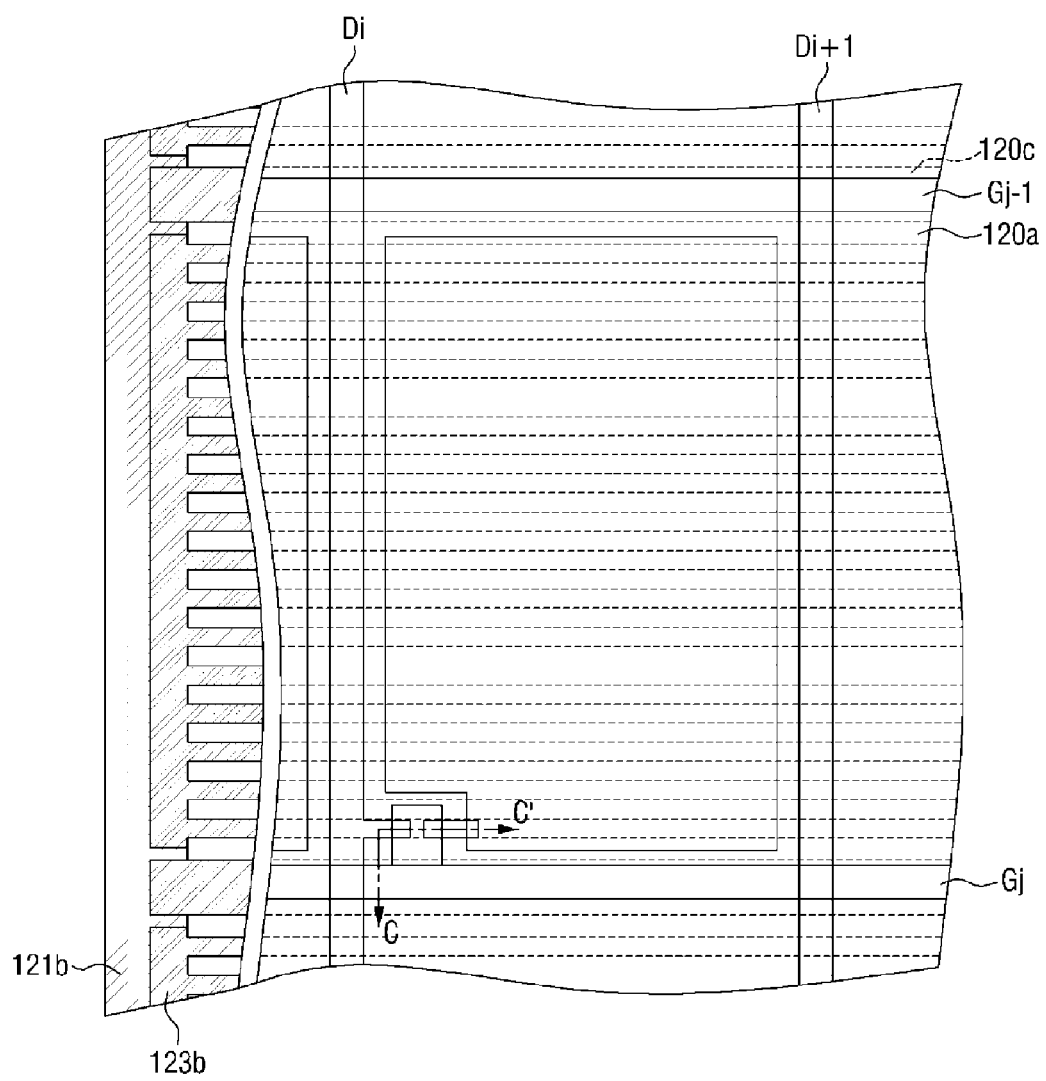
FIG. 7 is a schematic view of a lower panel of a display device according to an exemplary embodiment of the inventive concept.
Figure 8:
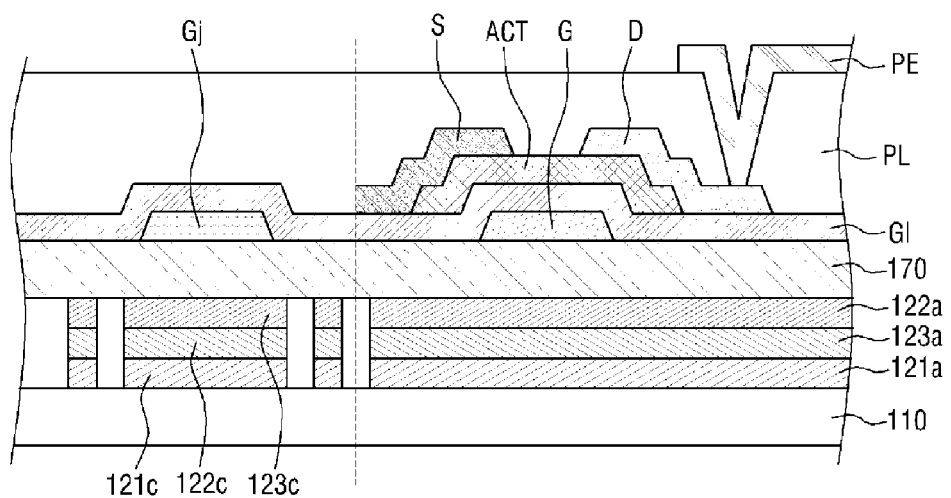
FIG. 8 is a cross-sectional view taken along line C-C' of FIG. 7.

FIG. 7 is a schematic view of a lower panel of a display device according to an exemplary embodiment, and FIG. 8 is a cross-sectional view taken along line C-C' of FIG. 7.

Referring to FIGS. 7 and 8, the lower panel of the display device according to an exemplary embodiment may be a thin-film transistor (TFT) panel. A gate electrode G and gate lines Gj−1 and Gj are disposed on a protective layer 170, and a gate insulating layer GI is disposed on the gate electrode G, the gate line Gj−1 and Gj and the protective layer 170. A semiconductor layer ACT is disposed on the gate insulating layer GI to at least partially overlap the gate electrode G, and source and drain electrodes S and D are disposed on the semiconductor layer ACT to be isolated from each other. A passivation layer PL is disposed on the gate insulating layer GI, the source electrode S, the semiconductor layer ACT and the drain electrode D, and a pixel electrode PE is disposed on the passivation layer PL and is electrically connected to the drain electrode D through a contact hole that exposes at least part of the drain electrode D therethrough.

In the exemplary embodiment of FIG. 7, a reflective layer 120c may be formed only in an area corresponding to the gate lines Gj−1 and Gj, and a plurality of wire patterns 120a may be repeatedly formed over an entire display area along a direction parallel to the gate lines Gj−1 and Gj. However, the inventive concept is not limited to the exemplary embodiment of FIGS. 7 and 8. That is, in an alternative exemplary embodiment, the reflective layer 120c may also be formed in a data line area and a TFT area. In this alternative exemplary embodiment, the wire patterns 120a may be formed in each pixel area defined by the gate lines Gj−1 and Gj and data lines Di and Di+1.

In the exemplary embodiment of FIG. 7, a second conductive reflective layer pattern 123c and a second conductive wire pattern 123a are physically disconnected from each other, but the invention is not limited thereto. That is, in an alternative exemplary embodiment, the second conductive reflective layer pattern 123c and the second conductive wire pattern 123a may be connected to each other in a non-wire pattern area by a second conductive pattern 123b. In another exemplary embodiment, another second conductive reflective layer pattern may be formed in an area corresponding to the data lines Di and Di+1 to be electrically connected to the second conductive wire pattern 123a.

In the non-wire pattern area, a first conductive pattern 121b and the second conductive pattern 123b may have different shapes from each other. Accordingly, the first and second conductive patterns 121b and 123b may be provided with different voltages, and may be selectively provided with a voltage and used as electrodes.

The protective layer 170 may be formed of any insulating material, for example, SiOx, SiNx or SiOC, but the inventive concept is not limited thereto.

The display device according to an exemplary embodiment may additionally include a backlight unit (not illustrated) that is disposed below the lower substrate and emits light, a liquid crystal panel (not illustrated), which includes the lower substrate, a liquid crystal layer (not illustrated) and an upper substrate (not illustrated), and an upper polarizing plate (not illustrated) that is disposed above the liquid crystal panel.

The transmission axes of the upper polarizing plate and the wire grid polarizer may be orthogonal or parallel to each other. In an exemplary embodiment, the upper polarizing plate may be implemented as a wire grid polarizer, or as a typical polyvinyl alcohol (PVA)-based polarizing film. In another exemplary embodiment, the upper polarizing plate may not be provided.

The backlight unit may include, for example, a light guide plate (LGP) (not illustrated), one or more light source units (not illustrated), a reflective member (not illustrated), and one or more optical sheets (not illustrated).

The LGP, which changes the path of light emitted from the light source unit so that light is transmitted toward the liquid crystal layer, may include a light incidence surface upon that receives light and a light emission surface through which light exits the LGP in the direction of the liquid crystal layer. The LGP may be formed of a light-transmitting material with a predetermined refractive index, such as polymethyl methacrylate (PMMA) or PC. However, the inventive concept is not limited to any particular LGP composition.

Light incident upon one or both sides of the LGP may have a smaller angle of incidence than the critical angle of the LGP, and may thus enter the LGP. On the other hand, light incident upon the top or bottom surface of the LGP may have a greater angle of incidence than the critical angle of the LGP, and may thus experience total internal reflection and be evenly distributed throughout the LGP instead of being emitted outwards from the LGP.

A plurality of diffusion patterns may be formed on one of the top and bottom surfaces of the LGP, for example the bottom surface of the LGP that is opposite to the light emission surface of the LGP, so as for guided light to be emitted upwards. More specifically, in order for light transmitted within the LGP to be emitted upwards, the diffusion patterns may be printed on one surface of the LGP with ink, but the inventive concept is not limited thereto. That is, fine grooves or protrusions may be formed on the LGP as the diffusion patterns, or various other modifications may be made to the diffusion patterns without departing from the scope of the invention.

A reflective member (not illustrated) may be additionally provided between the LGP and a lower receiving member (not illustrated). The reflective member reflects light emitted from the bottom surface of the LGP, which is opposite to and faces the light emission surface of the LGP, and thus applies the light back to the LGP. The reflective member may be formed as a film, but the invention is not limited thereto.

The light source units may be disposed to face the light incidence surface of the LGP. The number of light source units provided may be varied. For example, only one light source unit may be provided on one side of the LGP. Alternatively, three or more light source units may be provided to correspond to three or more sides of the LGP. In still another alternative embodiment, a plurality of light source units may be provided to correspond to only one side of the LGP. The backlight unit has been described above, taking as an example a side light-type backlight unit in which one or more light source units are provided on one or more sides of an LGP, but this is not a limitation of the inventive concept. That is, the inventive concept is also applicable to a direct-type backlight unit or another light source device, such as a surface-type light source device.

Each of the light source units may include a white light-emitting diode (LED), which emits white light, or a plurality of LEDs that emit red (R) light, green (G) light and blue (B) light. In response to each of the light source units including a plurality of LEDs, which emit R light, G light, and B light, white light may be realized by turning on all the LEDs to mix the R light, G light, and B light together.

The upper substrate may be a color filter (CF) substrate. For example, the upper substrate may include a black matrix (not illustrated) that is provided at the bottom of a member formed of a transparent insulating material such as glass or plastic and prevents light from leaking from the member. The upper substrate may also include R, G and B CFs (not illustrated), and a common electrode (not illustrated), which is an electric field generating electrode formed of a transparent conductive oxide such as indium tin oxide (ITO) or indium zinc oxide (IZO), but the inventive concept is not limited thereto. That is, the CFs may be provided at the lower substrate, and the common electrode may be provided at the lower panel together with pixel electrodes (not illustrated). The black matrix may be provided at the lower panel, in which case the black matrix may be formed in one body with spacers (not illustrated).

The liquid crystal layer, which contains liquid crystal molecules that rotate the polarizing axis of incident light, is aligned in a predetermined direction and is disposed between the upper substrate and the lower substrate. The liquid crystal layer may be of a twisted nematic (TN) mode, a vertical alignment (VA) mode, or a horizontal alignment mode (such as an in-plane switching (IPS) mode or a fringe field switching (FFS) mode) with positive dielectric anisotropy, but the invention is not limited thereto.

FIGS. 9 to 15B are cross-sectional views illustrating a method of fabricating a wire grid polarizer, according to an exemplary embodiment.

Figure 9:
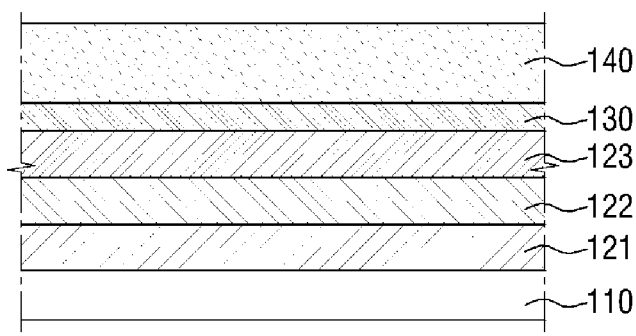
FIGS. 9, 10A, 10B, 11A, 11B, 12A, 12B, 13A, 13B, 14A, 14B, 15A, and 15B are cross-sectional views illustrating a method of fabricating a wire grid polarizer, according to an exemplary embodiment of the inventive concept.

Referring to FIG. 9, a first conductive wire pattern layer 121, an insulating layer 122, a second conductive wire pattern layer 123, a hard mask layer 130 and a mask layer 140 may be sequentially deposited on a substrate 110.

A suitable material for the substrate 110 may be selected considering the use and the type of processing that the substrate 110 will be subjected to, as long as the substrate 110 can transmit visible light therethrough. For example, the substrate 110 may be formed of various polymers such as glass, quartz, acrylic, TAC, a COP, a COC, PC, PET, or PES, but this is not a limitation of the inventive concept. The substrate 110 may be implemented as an optical film with a certain degree of flexibility.

The first and second conductive wire pattern layers 121 and 123 may be formed of a metal material. More specifically, the first and second conductive wire pattern layers 121 and 123 may be formed of a metal selected from the group consisting of Al, Cr, Au, Ag, Cu, Ni, Fe, W, Co, Mo or an alloy, an oxide or a nitride thereof, but this is not a limitation of the inventive concept.

In an exemplary embodiment, the first and second conductive wire pattern layers 121 and 123 may include Al, or may also include Ti or Mo at the top of the Al, but the invention is not limited thereto. More specifically, in response to the first and second conductive wire pattern layers 121 and 123 being formed of Al alone, hillocks may be generated during subsequent processes depending on the temperature of the subsequent processes. As a result, the top surfaces of the first and second conductive wire pattern layers 121 and 123 may become irregular, and the optical properties of the first and second conductive wire pattern layers 121 and 123 may deteriorate. To prevent the generation of hillocks, Ti or Mo may be additionally formed on the Al.

The insulating layer 122 may be formed of any insulating material. In an exemplary embodiment, the insulating layer 122 may be formed of an organic material or an inorganic material, and examples of the inorganic material include SiOx, SiNx and SiOC. However, the invention is not limited to this exemplary embodiment.

The hard mask layer 130 may be formed of any type of material having a different etching rate from the first and second conductive wire pattern layers 121 and 123. The hard mask layer 130 may be formed of the same material(s) as the insulating layer 122, but this is not a limitation of the inventive concept.

The mask layer 140 may be formed of any material that can be patterned. For example, an imprint resin or photoresist may be used to form the mask layer 140. The invention is not limited to the mask layer 140 having any particular composition.

The first conductive wire pattern layer 121, the insulating layer 122, the second conductive wire pattern layer 123, the hard mask layer 130 and the mask layer 140 may be formed by a typical sputtering method, a chemical vapor deposition (CVD) method, an evaporation method or a coating method. Again, the invention is not limited to any particular method of forming these layers.

FIGS. 10A to 15B are cross-sectional views taken along line A-A' or B-B' of FIG. 1.

Figure 10A:
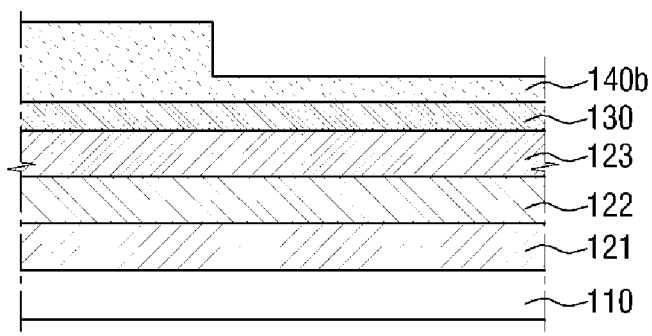
Figure 10B:
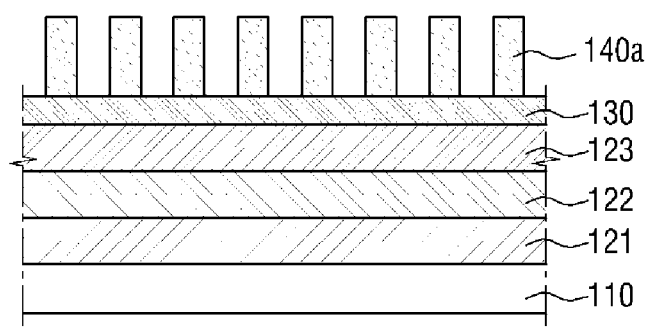

Referring to FIGS. 10A and 10B, a plurality of wire mask patterns 140a and a non-wire mask pattern 140b may be formed by multi-patterning the mask layer 140.

The mask layer 140 may be multi-patterned by a nano-imprinting method, which involves stamping a mold with a plurality of depths.

FIGS. 16A to 17B are cross-sectional views illustrating the fabrication of the wire mask patterns 140a and the non-wire mask pattern 140b by nano-imprinting.

The multi-patterning of the mask layer 140 will hereinafter be described with reference to FIGS. 16A to 17B.

Figure 16A:
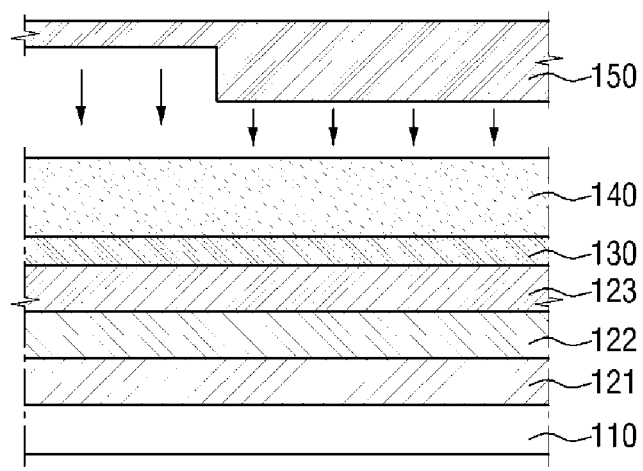
FIGS. 16A, 16B, 17A, and 17B are cross-sectional views illustrating a method of fabricating a mask pattern, according to an exemplary embodiment of the inventive concept.
Figure 16B:
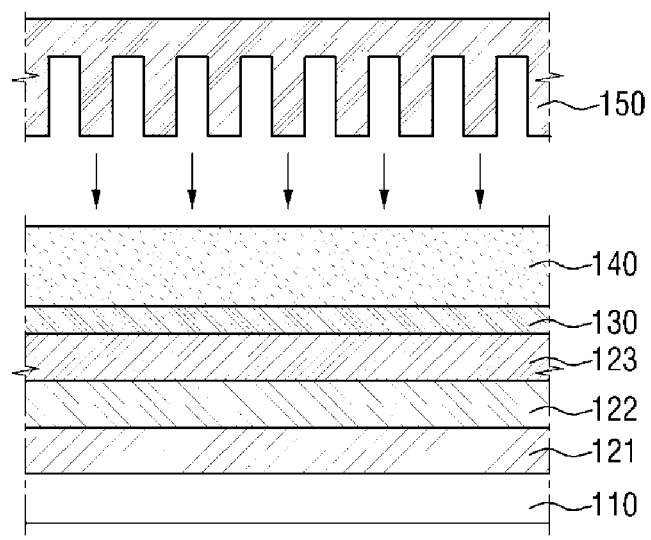

Referring to FIGS. 16A and 16B, the first conductive wire pattern layer 121, the insulating layer 122, the second conductive wire pattern layer 123, the hard mask layer 130 and the mask layer 140 may be formed on the substrate 110, and a mold 150 with different depths for a wire pattern area and a non-wire pattern area may be pressed and stamped on the mask layer 140. Even though not specifically illustrated in FIGS. 16A and 16B, the mask layer 140 may be fluidal. The mask layer 140 may be cured by applying light or heat with the mold 150 stamped thereon, and the mold 150 may be removed from the mask layer 140.

Figure 17A:
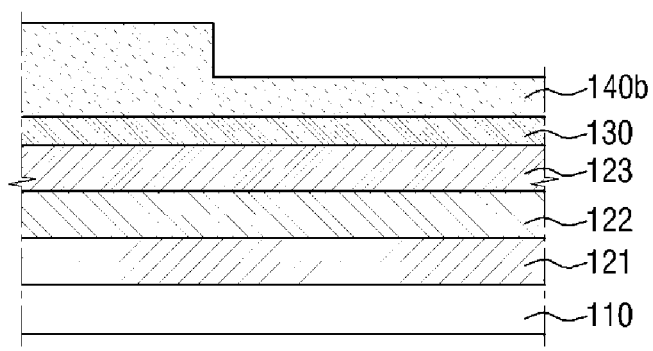
Figure 17B:
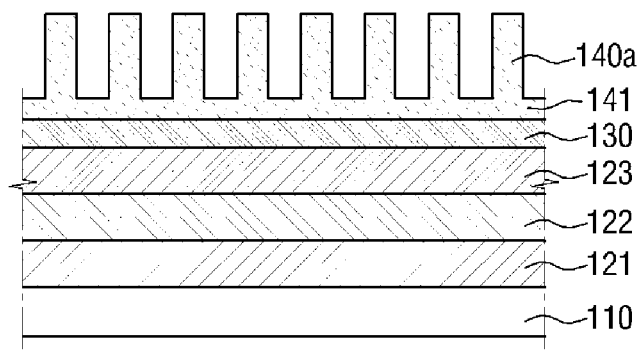

Referring to FIGS. 17A and 17B, the wire mask patterns 140a and the non-wire mask pattern 140b may be formed, and a mask layer 141 may remain at the bottom of the wire mask patterns 140a. Thereafter, the remaining mask layer 141 may be removed, thereby obtaining the wire mask patterns 140a and the non-wire mask pattern 140b of FIGS. 10A and 10B. The remaining mask layer 141 may be removed by a typical etching method. More specifically, in order to selectively remove the remaining mask layer 141 at the bottom of the wire mask patterns 140a, an anisotropic etching method may be used to perform a selective horizontal etching. However, this is just an option and the invention is not limited thereto.

The mask layer 140 may be multi-patterned by a photoresist method, which involves using a multi-tone mask. More specifically, the mask layer 140 may be multi-patterned by any typical patterning method.

Figure 18A:
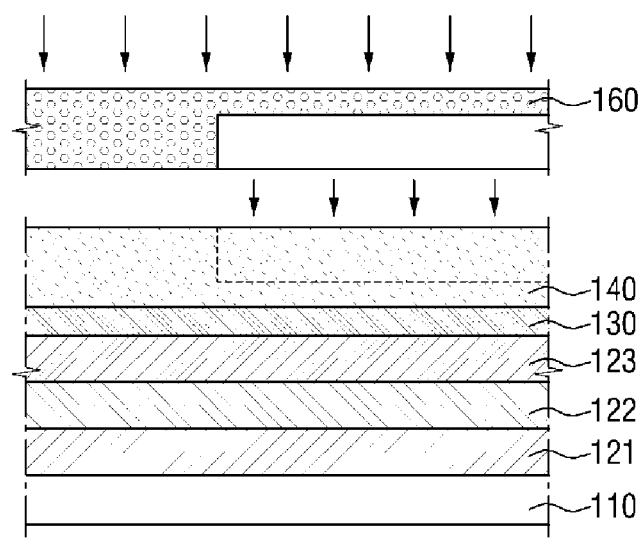
FIGS. 18A and 18B are cross-sectional views illustrating a method of fabricating a mask pattern, according to another exemplary embodiment of the inventive concept.
Figure 18B:
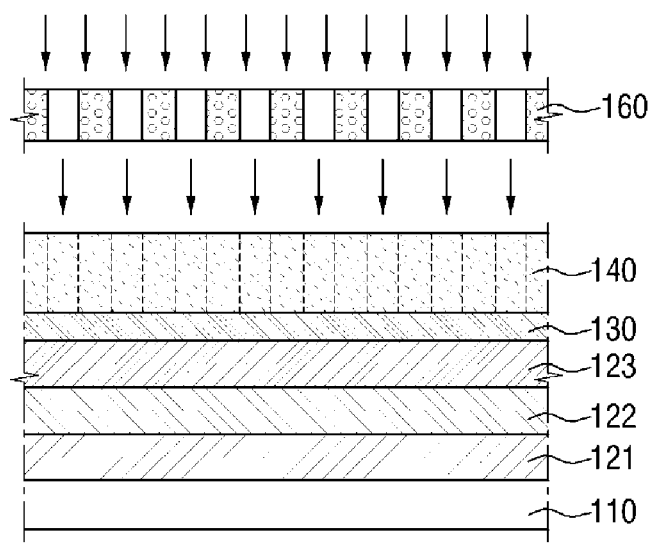

FIGS. 18A and 18B are cross-sectional views illustrating the fabrication of the wire mask patterns 140a and the non-wire mask pattern 140b by the photoresist method.

The multi-patterning of the mask layer 140 will hereinafter be described with reference to FIGS. 18A and 18B.

Referring to FIGS. 18A and 18B, the first conductive wire pattern layer 121, the insulating layer 122, the second conductive wire pattern layer 123, the hard mask layer 130 and the mask layer 140 may be formed on the substrate 110, and light may be selectively applied to the mask layer 140 by using a multi-tone mask 160. In an exemplary embodiment, in response to the first and second conductive wire pattern layers 121 and 123 being non-transmissive, light may need to be applied from above the mask layer 140. In an exemplary embodiment, to form different heights at the top of the mask layer 140, negative photoresist may be used. Parts of the negative photoresist that is exposed to light may be removable. However, the inventive concept is not limited to this exemplary embodiment.

The wire mask patterns 140a and the non-wire mask pattern 140b of FIGS. 10A and 10B may be obtained using the process described above.

Figure 11A:
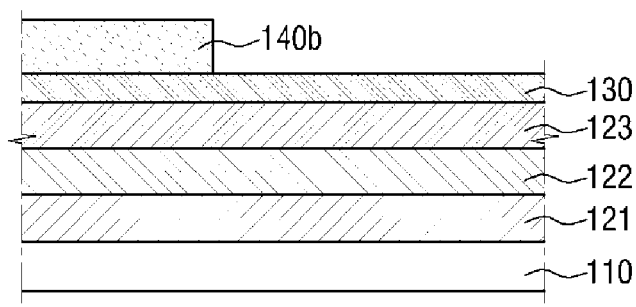
Figure 11B:
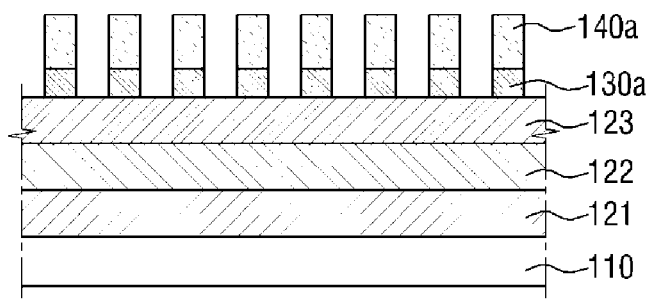

Referring to FIGS. 11A and 11B, a plurality of hard mask wire patterns 130a may be formed in the wire pattern area by etching the hard mask layer 130 with the use of the wire mask patterns 140a as a mask, and at the same time, the non-wire mask pattern 140b may be partially etched in the non-wire pattern area to expose part of the hard mask layer 130.

Figure 12A:
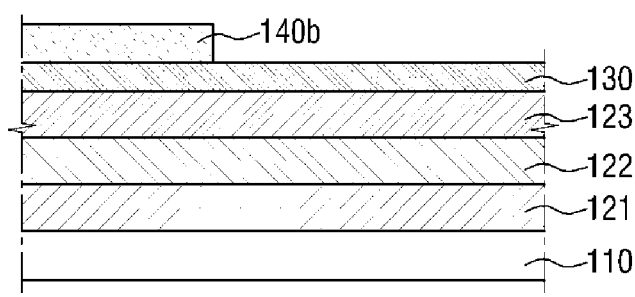
Figure 12B:
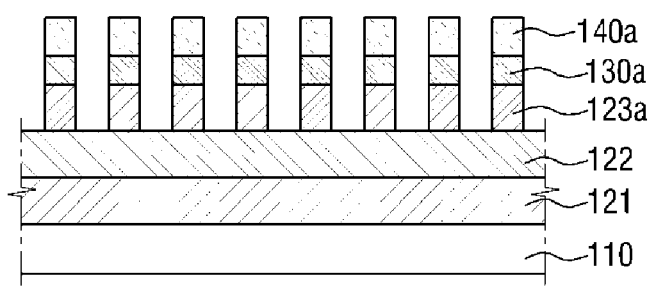

Referring to FIGS. 12A and 12B, a plurality of second conductive wire patterns 123a may be formed in the wire pattern area by etching the second conductive wire pattern layer 123 with the use of the wire mask patterns 140a and the hard mask wire patterns 130a as a mask, and at the same time, the non-wire mask pattern 140a and the hard mask layer 130 may be partially etched in the non-wire pattern area. The etching of the second conductive wire pattern layer 123 may be performed under etching conditions with a high etching selection ratio of the second conductive wire pattern layer 123 to the hard mask layer 130. In an exemplary embodiment, in response to the second conductive wire pattern layer 123 being formed of Al and the hard mask layer 130 being formed of SiOx, an Al etching process may be performed under a chlorine gas atmosphere at an Al:SiOx etching selection ratio of 7:1 or greater, but the inventive concept is not limited thereto.

By using the etching conditions with a high etching selection ratio of the second conductive wire pattern layer 123 to the hard mask layer 130, the amount by which the hard mask layer 130 is etched in the non-wire pattern area during the etching of the second conductive wire pattern layer 123 in the wire pattern area may be reduced.

Figure 13A:
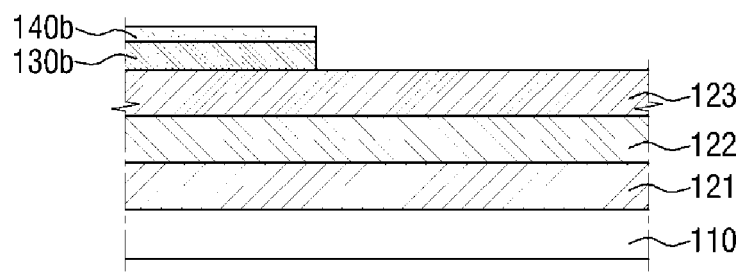
Figure 13B:
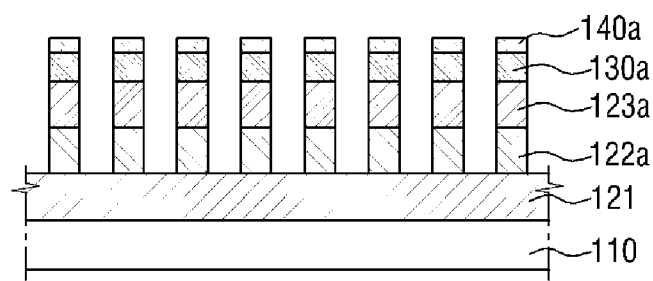

Referring to FIGS. 13A and 13B, a plurality of insulating wire patterns 122a may be formed in the wire pattern area by etching the insulating layer 122 with the use of the wire mask patterns 140a, the hard mask wire patterns 130a and the second conductive wire patterns 123a as a mask, and at the same time, the hard mask layer 130 that is exposed in the non-wire pattern area may be etched and removed.

The insulating layer 122 and the hard mask layer 130 may be formed of the same material(s), but such is not a limitation of the invention. That is, the insulating layer 122 and the hard mask layer 130 may be formed of different materials with similar etching selectivities under certain conditions.

Figure 14A:
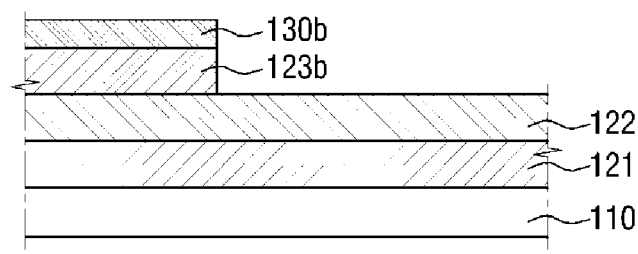
Figure 14B:
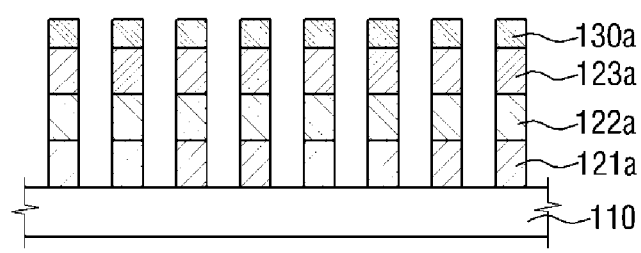

Referring to FIGS. 14A and 14B, a plurality of first conductive wire patterns 121a may be formed in the wire pattern area by etching the first conductive wire pattern layer 121 with the use of the wire mask patterns 140a, the hard mask wire patterns 130a, the second conductive wire patterns 123a and the insulating wire patterns 122a as a mask, and at the same time, a second conductive pattern 123b may be formed in the non-wire pattern area by etching the second conductive wire pattern layer 123 with the use of the non-wire mask pattern 140b and a hard mask non-wire pattern 130b as a mask.

Figure 15A:
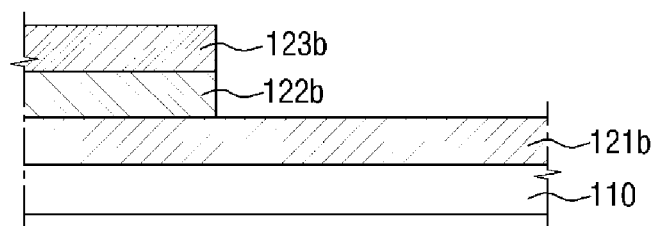
Figure 15B:
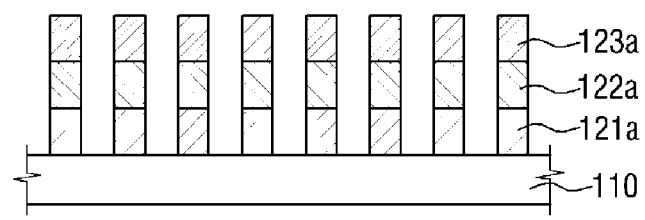

A wire grid polarizer may be used as is illustrated in FIGS. 14A and 14B. Alternatively, additional processes of patterning the insulating layer 122 in the non-wire pattern area and removing the hard mask wire patterns 130a in the wire pattern area may be performed on the wire grid polarizer of FIGS. 14A and 14B, thereby obtaining a wire grid polarizer as illustrated in FIGS. 15A and 15B.

Although preferred embodiments have been described for illustrative purposes, those skilled in the art will appreciate that various modifications, additions and substitutions are possible without departing from the scope and spirit of the inventive concept as disclosed in the accompanying claims.

What is claimed is:

1. A wire grid polarizer, comprising:
a substrate having a wire pattern area and a non-wire pattern area;
a plurality of conductive wire patterns formed parallel to one another formed on the substrate in the wire pattern area but not in the non-wire pattern area, wherein each of the conductive wire patterns includes a first conductive wire pattern disposed on the substrate in the wire pattern area but not in the non-wire pattern area, an insulating wire pattern disposed on the first conductive wire pattern in the wire pattern area but not in the non-wire pattern area, a second conductive wire pattern disposed on the insulating wire pattern in the wire pattern area but not in the non-wire pattern area, wherein the second conductive wire patterns do not contact each other in the wire pattern area; and
a first conductive pattern disposed on the substrate in the non-wire pattern area but not in the wire pattern area, an insulating pattern disposed on the first conductive pattern in the non-wire pattern area but not in the wire pattern area, and a second conductive pattern disposed on the insulating pattern in the non-wire pattern area but not in the wire pattern area,
wherein the second conductive pattern contacts the second conductive wire patterns at a boundary between the wire pattern area and the non-wire pattern area,
wherein the first conductive wire pattern and the second conductive wire pattern are electrically insulated from each other,
wherein the first conductive pattern is longer than the second conductive pattern in a first direction along which the first conductive wire patterns extend,
wherein the first conductive pattern has a different length from each of the first conductive wire patterns in a second direction perpendicular to the first direction,
wherein the second conductive pattern has a different length from each of the second conductive wire patterns in the second direction,
wherein the first conductive wire pattern, the insulating wire pattern, and the second conductive wire pattern have a substantially same shape, and
wherein the first conductive pattern includes a same material as the first conductive wire pattern, the insulating pattern includes a same material as the insulating wire pattern, and the second conductive pattern includes a same material as the second conductive wire pattern.

2. The wire grid polarizer of claim 1, wherein at least one of the first and second conductive wire patterns is electrically connected to a common electrode.

3. The wire grid polarizer of claim 1, wherein at least one of the first and second conductive wire patterns includes one or more wire pattern blocks each having a plurality of wire patterns that are electrically connected together.

4. The wire grid polarizer of claim 3, wherein the wire pattern blocks are electrically insulated from each other.

5. The wire grid polarizer of claim 1, wherein the insulating wire pattern has a refractive index of 1.0 to 2.0.

6. The wire grid polarizer of claim 1, further comprising:
a reflective layer configured to be disposed on the substrate between the conductive wire patterns.

7. The wire grid polarizer of claim 1, wherein the second conductive pattern and the insulating pattern have a substantially same shape.

8. A wire grid polarizer, comprising:
a substrate having a wire pattern area and a non-wire pattern area;
a plurality of conductive wire patterns formed parallel to one another formed on the substrate in the wire pattern area but not in the non-wire pattern area, wherein each of the conductive wire patterns includes a first conductive wire pattern disposed on the substrate in the wire pattern area but not in the non-wire pattern area, an insulating wire pattern disposed on the first conductive wire pattern in the wire pattern area, a second conductive wire pattern disposed on the insulating wire pattern in the wire pattern area but not in the non-wire pattern area, wherein the second conductive wire patterns do not contact each other in the wire pattern area; and a first conductive pattern disposed on the substrate in the non-wire pattern area but not in the wire pattern area, an insulating pattern disposed on the first conductive pattern in the non-wire pattern area but not in the wire pattern area, and a second conductive pattern disposed on the insulating pattern in the non-wire pattern area but not in the wire pattern area, wherein the second conductive pattern contacts the second conductive wire patterns at a boundary between the wire pattern area and the non-wire pattern area, wherein the first conductive wire pattern and the second conductive wire pattern are electrically insulated from each other, wherein the first conductive pattern is longer than the second conductive pattern in a first direction along which the first conductive wire patterns extend, wherein the first conductive pattern has a different length from each of the first conductive wire patterns in a second direction perpendicular to the first direction, wherein the second conductive pattern has a different length from each of the second conductive wire patterns in the second direction, wherein the first conductive wire pattern is electrically connected to the first conductive pattern, and wherein the second conductive wire pattern is electrically connected to the second conductive pattern.

\* \* \* \* \*